May 28, 1957 W. A. RAY Re. 24,321

FLUID CONTROL VALVE

Original Filed July 12, 1944 2 Sheets-Sheet 1

Inventor:
WILLIAM A. RAY,
By John Flaw Attorney.

May 28, 1957 W. A. RAY Re. 24,321

FLUID CONTROL VALVE

Original Filed July 12, 1944 2 Sheets-Sheet 2

Inventor:
WILLIAM A. RAY,
By John Flano Attorney.

United States Patent Office

Re. 24,321
Reissued May 28, 1957

24,321

FLUID CONTROL VALVE

William A. Ray, North Hollywood, Calif., assignor to General Controls Co., a corporation of California Original No. 2,712,429, dated July 5, 1955, Serial No. 223,496, April 28, 1951, which is a continuation of application Serial No. 544,511, July 12, 1944, which is a division of application Serial No. 407,932, August 22, 1941. Application for reissue November 15, 1956, Serial No. 622,725

17 Claims. (Cl. 251—130)

Matter enclosed in heavy brackets [ ] appears in the original patent but forms no part of this reissue specification; matter printed in italics indicates the additions made by reissue.

This invention relates to valves particularly designed for the control of gaseous fuels, and operated by an electromagnet.

This application is a continuation of application Serial Number 544,511, filed July 12, 1944 (now abandoned), and which is a division of application Serial Number 407,932, filed August 22, 1941, now Patent No. 2,358,999, granted September 26, 1944.

It is one of the objects of this invention to provide an electromagnetically operated valve in which the danger of sticking is greately minimized.

Often, a solenoid-type of electromagnet is used in which a plunger is guided in a sleeve and engages a stationary stop upon energization of the electromagnet. If the gaseous fuel is permitted to enter the sleeve, it may deposit a gummy substance in the sleeve and on the stop. Accordingly, failure of the plunger to drop out would occur.

It is another object of this invention to ensure against the deposit of such gummy material by sealing off the magnetic circuit elements from the gas passageways.

Another object is to provide, in a solenoid operated valve, means for manually operating the valve upon failure of supply of electrical energy and for maintaining the valve in operated condition, the manual operating means being so arranged that it is rendered ineffective when the supply of electrical energy is restored.

Another object is the provision of means for delaying the actuation of condition-controlling means, such as switching means, for a predetermined interval after the operation of movable means, such as a valve operator, the delaying means being effective subsequently to delay the deactuation of the condition-controlling means for a predetermined interval after the return of the movable means to unoperated position.

Another object is the provision, in a time-delay system of the character described, of means for effecting a two-way snap-action of the condition-controlling means.

Other objects and advantages of the invention will be found in the description, the drawing, and the claim; and, for full understanding of the invention, reference is to be had to the following detailed description and accompanying drawing, wherein:

Figure 5:
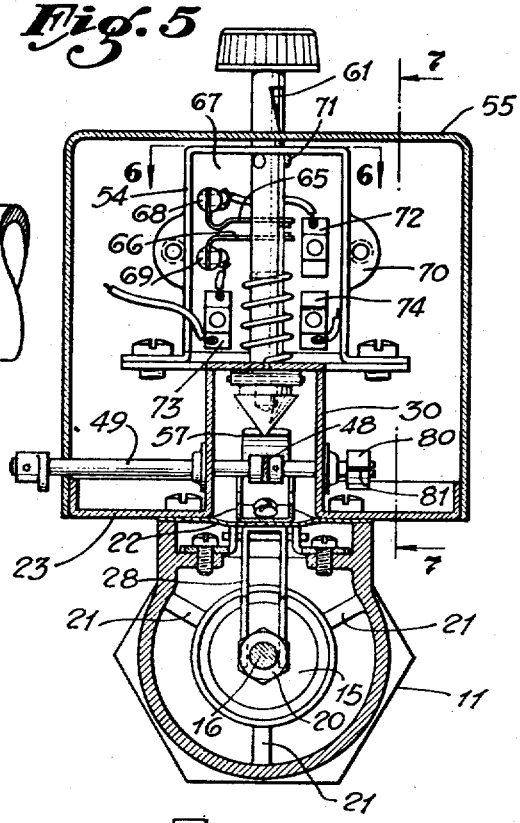
Figure 5 is a vertical section, taken along the irregular line 5—5 of Fig. 1.
Figure 8:
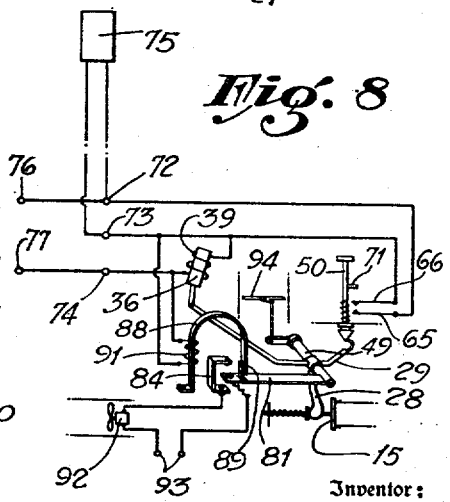

7—7 of Fig. 5, with the housing 55 broken away to show, in particular, the time-delay mechanism; and Figure 8 is a diagrammatic view of the apparatus shown in the other figures, along with an appropriate electrical control circuit therefor.

In the drawing, the numeral 11 indicates a valve casing having an inlet 12 and an outlet 13, the inner portion of the casing adjacent the outlet being built up to provide an annular valve seat 14. Cooperable with this seat is a dished closure member 15 secured to one end of a valve stem 16, the other end portion of the stem extending freely through a central opening in an otherwise apertured cup-shaped washer 17 located in the inlet of the casing and held from outward movement by a wire ring 18 snapped into a groove formed in the inlet wall, and engageable with the periphery of the washer. A spring 19, surrounding the valve stem 16 and compressed between the washer 17 and a nut 20 threaded on an intermediate portion of the stem, serves to urge the closure member 14 toward its seat and the washer 17 against its retaining snap ring. The periphery of the closure member 14 is guided by three spaced portions 21 extending from the inner wall of the casing.

Covering an opening through the top wall of casing 11 is a flexible diaphragm 22, of material such as leather, or thin sheet metal, the marginal portion of which is clamped between the casing and the bottom flange 23 of a sub-housing, generally indicated at 24, attached to the casing. Pivoted on a pin 25, mounted in spaced brackets 26 attached to horizontal platforms 27 extending from the upper inner side walls of the casing (Fig. 5), is a U-shaped arm 28, the rounded lower extremities of which straddle the portion of valve stem 16 between the closure member 15 and nut 20. The upper cross-portion of arm 28 abuts the underside of diaphragm 22, and above it is the medial portion of a channelled lever 29, the arm 28 and lever 29 being secured together and to the diaphragm at these portions by screws. It is thus apparent that the arm and the lever can be rocked as a unit on pin 25 to operate the closure member 15, the pin 25 being located as close as is practicable to the plane of the diaphragm so as to minimize flexure of the same. The general valve-operating arrangement thus far described is disclosed in my copending application, Serial Number 378,756, filed February 13, 1941, now Patent No. 2,354,704, issued August 1, 1944; and is claimed in a division of the aforesaid application, Serial Number 536,699, filed May 22, 1944, now Patent No. 2,442,877, granted June 18, 1948.

The sub-housing 24 is of generally rectangular form, and comprises side walls 30 turned up from flange portion 23 (Fig. 5), end walls 31, and an overlapping top wall 32, the walls being secured together as by welding or solder, to form, together with diaphragm 22, a sealed compartment.

Threaded in an opening in an inclined portion of the top wall 32 is a solenoid device, generally indicated at 33, comprising a sleeve 34, the upper end of which is closed by a plug 35, and a plunger 36 freely reciprocable in the sleeve and limited in upward movement by a round-ended stop pin 37, secured in plug 35, which cooperates with a concentric conical recess 38 in the upper end of the plunger to center that end in the sleeve when the plunger is attracted by the energization of coil 39. The plunger is generally square in cross-section, its corners being rounded so that the plunger is a loose fit in the sleeve. The corners 40 of the lower end of the plunger are slightly larger in diameter (but still considerably smaller than the internal diameter of the sleeve) so that, if a lateral force is applied to the lower end of the plunger when it is in its attracted position, only these corners can engage the sleeve. The general solenoid construction shown herein is disclosed and claimed in U. S. Patents No. 2,096,763 (and reissue thereof No. 21,881) to Ray et al., and No. 2,098,195 to Ray, and will not be further described.

The lower end portion of the plunger 36 is axially slotted to receive one end of a link 45 which is pivoted on a pin 46 secured in the plunger, the other end of the link being pivoted on a pin 47 extending between the side walls of the bent-up left-hand end portion of the channelled lever 29. Between the link and a side wall of the lever is an end portion of an arm 48 which is secured at its thickened other end to a rod 49 sealingly journalled in openings in the side walls 30 of the sub-housing, for a purpose hereinafter to be described. The arm 48, being rotatable on a center different from that of the unit composed of lever 29 and arm 28, is slotted to receive pin 47.

Figure 2:
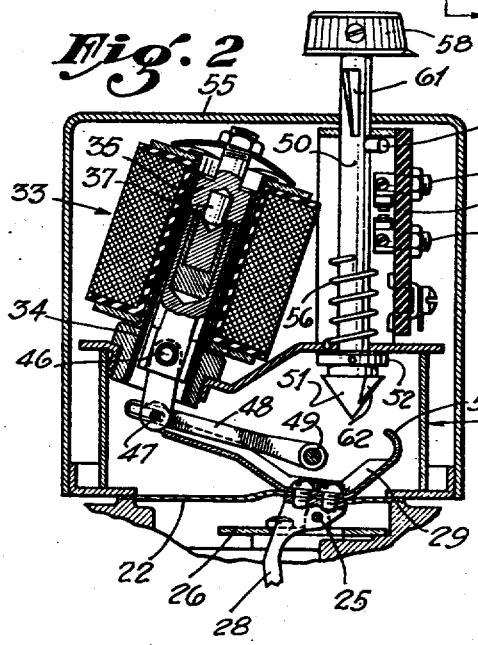
Figures 2 and 3 are fragmentary views, similar to that of Fig. 1, showing the parts in positions assumed in operation.

By its linked connection with lever 29, when the solenoid plunger is attracted by energization of coil 39, arm 28 is rocked to move closure member 15 to its open position against the bias of spring 19. It will be noted that the counter force of spring 19 is applied laterally to the lower end of the plunger (the general axis of movement of link 45 being at an angle to the axis of the plunger) so that, while its upper end is centered by pin 37, its lower end portion 40 is held tightly against the right-hand side of the sleeve, as is shown in Fig. 2. The components of magnetic and mechanical forces applied to the plunger in its attracted position serve to prevent vibration and hum when the solenoid is energized by alternating current. Due to the inclined position of the solenoid, gravity acting on the plunger also contributes to this effect, and may, in modified constructions, be the controlling factor. These features are claimed in the aforementioned parent application, Serial Number 407,932, now Patent No. 2,358,999, granted September 26, 1944.

Figure 1:
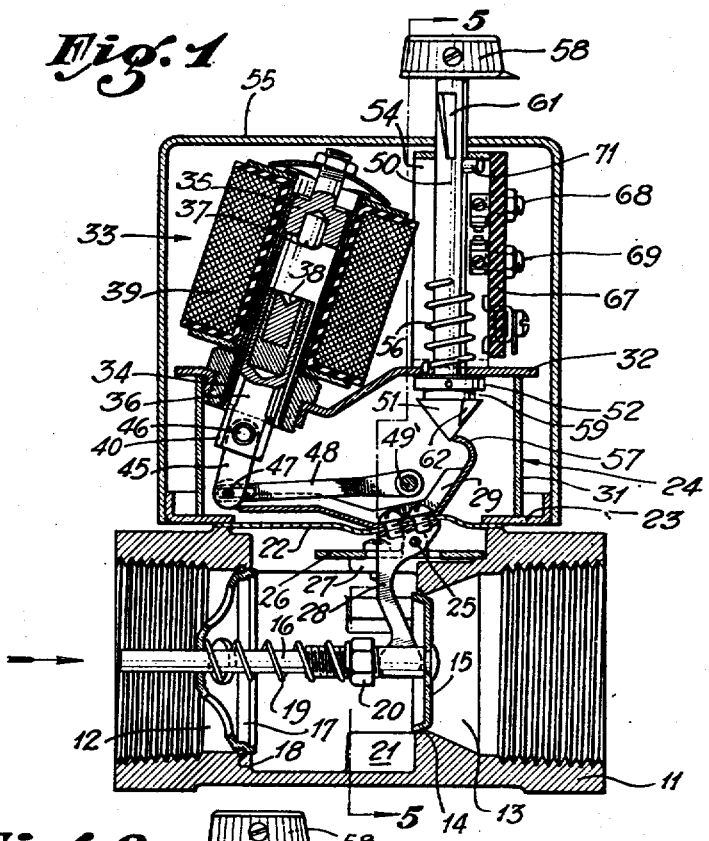
Figure 1 is a vertical sectional view of a solenoid-operated valve embodying features of the invention.

Extending through an opening in a horizontal portion of the top wall 32 of the sub-housing 24 is a rod 50 which is provided, at its lower end, with a conical head 51, spaced above which, and attached to the rod, is a collar 52 having an upper facing 53 (Fig. 3) of leather, or the like. The upper portion of the rod 50 is guided in an opening in the top portion of a U-shaped bracket 54, mounted on the wall 32, and extends freely through an aligned opening in the top wall of a cylindrical protective housing 55, which is frictionally mounted on the turned-up peripheral portion of flange 23. Rod 50 is urged upwardly by a spring 56, secured at one end to the rod and at the other to the wall 32, so that, in the normal position of the rod as shown in Fig. 1, the collar 52, by its facing 53, seals the adjacent opening around the rod. It will be noted that, in the event of rupture of the diaphragm, leakage of fluid would be confined to the space defined by the interior of the sub-housing and the solenoid sleeve.

Furthermore, the diaphragm 22 serves to isolate the plunger 36, the sleeve 34, and the exposed parts of stop pin 37 from the flow of gas controlled by the valve. Accordingly, there is no danger of the valve sticking in open position on account of the accumulation of gummy deposits from the gas flow. In addition, the sealed sub-housing 24 ensures against the entry of any other form of foreign matter that may interfere with free movement of plunger 36.

The head 51 of rod 50 is cooperable with the hooked end 57 of the bent-up right-hand end portion of lever 29. In the event of failure of electrical supply for the solenoid 33, the valve may be operated by manipulation of rod 50. When this rod is moved downward by finger pressure on a button 58, the lever 29 is rocked, the hook 57 riding on the tapered surface of cone 51 until it drops into the recess 59 between the cone and the collar 52, the parts assuming the positions shown in Fig. 3. Pressure on button 58 may now be released, the closure member 15 being held in substantially full-open position by engagement of hook 57 with head 51.

It will be noted that, in the manual opening of the valve, the solenoid plunger 36 is moved only partially toward its attracted position, so that, upon resumption of electrical supply, it is moved still farther upward, thereby rocking lever 29 so that the engagement of hook 57 with the head 51 is released and the rod 50 returns to its normal raised position under the influence of spring 56.

Figure 4:
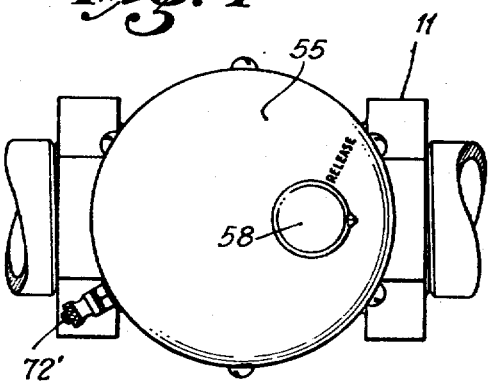
Figure 4 is a plan of the valve shown in Fig. 1.
Figure 6:
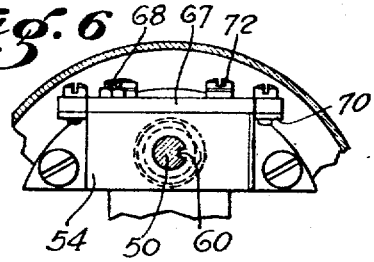
Figure 6 is a fragmentary horizontal section, taken along the line 6—6 of Fig. 5.

As is seen in Fig. 6, the guide hole for rod 50 in the top portion of bracket 54 provides a tongue 60 which extends into a shallow slot 61 formed in the upper side wall of rod 50. This slot is wider at its upper end than at its lower, so that limited rotation of the rod is permitted when it is in its depressed position. Spring 56 is so arranged that it exerts a rotative force on rod 50, tending to retain the vertical, or right-hand, side of the slot 61 in engagement with the tongue 60. If it is desired to reclose the valve (after it has been manually opened) before the resumption of electrical supply, the button 58 is rotated to its "Release" position, shown in Fig. 4, against the torsional bias of spring 56, thereby bringing a flattened or cut-away surface 62 of the otherwise conical head 51 into register with hook 57, so that the rod can then move upward to permit the valve to close under the force of its bias.

Figure 3:
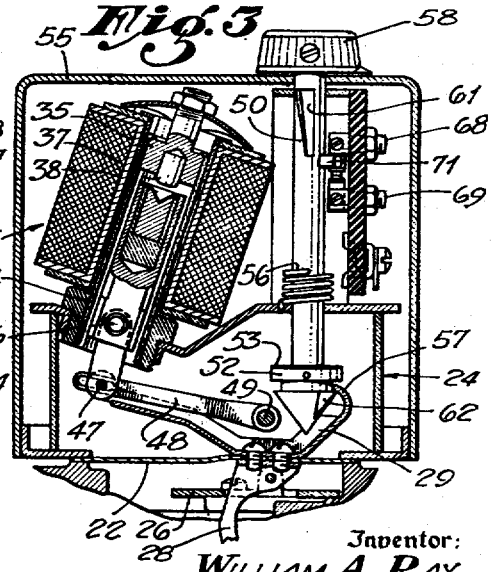

If the solenoid is connected to the electrical supply service in series with an automatic controlling device, such as a thermostat, or other limit-control, it is desirable that the valve, upon resumption of electrical service after the valve has been manually opened, should immediately close if the limit-control is calling for such operation. However, under such condition of the limit-control, its switching means would generally be open, so that no energy would normally be available at the solenoid for raising its plunger to release the manual holding means. To overcome this defect, I have provided switching means, actuated by the manual valve-operating means, whereby the plunger will be released upon resumption of electrical service, regardless of the condition of the limit control. These means are more clearly shown in Fig. 5, and comprise a pair of resilient contact blades 65 and 66 which are mounted on an insulating base 67 by means of posts 68 and 69, respectively, the base being attached to the ear portions 7 of the bracket 54. In the downward movement of rod 50, a pin 71 (preferably of insulating material) carried thereby, engages blade 65 and flexes it into contact with blade 66, as shown in Fig. 3. Post 68 is connected by a wire to a terminal plate 72 and post 69 to another plate 73, to which plate one lead of the solenoid is also connected. The other solenoid lead is connected to a third terminal plate 74. The corresponding terminal posts, shown on housing 55 in Fig. 7, have been assigned primed numerals. Referring to the corresponding diagram of Fig. 8, it will be seen that the contact blades are connected in shunt with the terminals of a thermostat 75, and that the thermostat is connected in series with the power supply terminal 76 and one lead of the solenoid, the other solenoid lead going directly to the other power supply terminal 77. The blades 65 and 66, when in contact, thus complete a circuit from the power supply terminals to the solenoid independent of the thermostat, so that, upon resumption of electrical service, the solenoid plunger is attracted to its fully raised position, releasing the rod 50, the resultant upward movement of the rod effecting disengagement of the contact blades. If the thermostat switch is now in closed condition, the plunger remains in energized position, since the solenoid is connected to the power terminals through this switch; but, if the thermostat switch happens to be open after the plunger is initially attracted, it then falls when the blades 65—66 separate.

Figure 7:
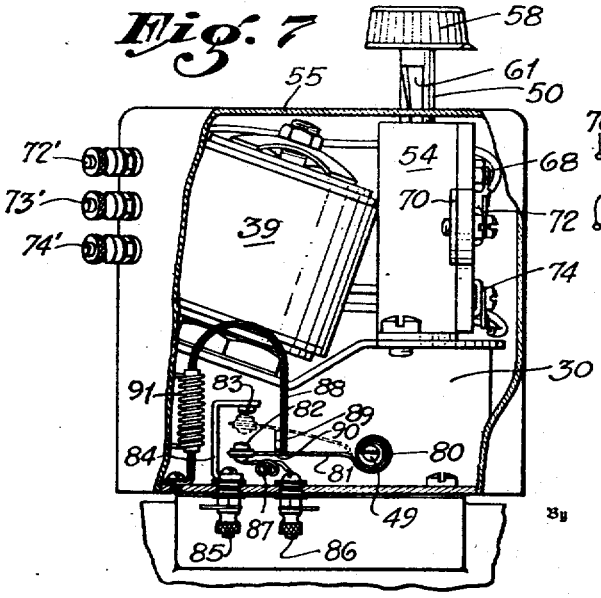
Figure 7 is a side elevation, taken in the plane of line

Referring now more particularly to Fig. 7 and the corresponding diagrammatic showing of Fig. 8, rod 49 is connected by arm 48 to the lever 29 so that it moves in accordance therewith, as was described hereinabove. Yieldably connected to an end of rod 49, exterior to the sub-housing 24, by its volute portion 80, is a resilient arm 81 which insulatingly carries on its free end a contact element 82. Cooperable with this contact element is another similar element 83 mounted on a bracket 84 which is insulatingly attached to the flange 23. Insulated terminals 85 and 86 are provided for the electrical connection of the contact elements in a circuit, terminal 86 being connected to element 82 by a flexible wire 87. Also mounted by one of its ends on flange 23 is a U-shaped bimetallic member 88, the free end of which carries a head 89 normally positioned immediately above a solid portion of arm 81, and adjacent an opening 90 formed therein, this opening being of such size and shape as freely to receive the head 89 and the portion of member 88 to which it is attached. Wrapped around a portion of the bimetallic member is a resistance coil 91 which, when energized by passage of current therethrough, is effective to heat the bimetallic member so that its free end warps in a left-hand direction.

When the solenoid is energized, in the opening movement of the valve, the rod 49 is rotated in a clockwise direction (as viewed in Fig. 7) so that arm 81 is moved into engagement with the head 89 of the bimetallic member, additional rotation of the rod effecting flexure of the arm and, in particular, of its volute portion 80. As is shown in Fig. 8, the resistance coil 91 is connected in parallel with the solenoid coil so that heating of the bimetallic member is now initiated. After a predetermined interval, warping of the bimetallic member moves its head 89 into register with opening 90, with the result that arm 81 is suddenly projected upward, bringing contact elements 82 and 83 into engagement, as is shown in broken lines in Fig. 7. In this position of arm 81, the upper edge of the head 89 is latched under the portion of arm 81 adjacent the left-hand edge of opening 90 due to the arcuate path of the end of this arm. Continued energization of the resistance coil effects slight additional movement of the bimetallic member in a left-hand direction until the portion thereof above head 89 is in engagement with the left-hand edge of the opening, in which position it remains during the energization of the resistance coil and solenoid. Should energization now be discontinued, the valve closes and the arm 81 tends to assume its normal position. However, due to the engagement of head 89 with the underside of arm 81, the same is restrained from movement until the bimetallic member has cooled sufficiently again to bring its head into register with the opening 90, whereupon arm 81 moves suddenly downward, opening contacts 82—83. The time-delay feature may, for example, be advantageously employed in connection with the control of the circulating fan of a hot-air heating system. Referring to Fig. 8, and assuming that the closure member 15 is arranged to control flow of fuel to a gas-consuming hot-air furnace, fan 92 will be operated upon engagement of contacts 82—83 a predetermined interval after the opening of the valve, and its operation will be continued for an interval after the reclosing of the valve, so that the air will be circulated while, and only while, it is hot. Terminals 93 of the fan circuit are preferably connected directly to the service lines, the valve and control terminals 76—77 usually being connected to a low-voltage supply to minimize fire hazard in the thermostat circuit. In Fig. 8, a damper 94 is shown connected for operation by rod 49. Such a damper may, for example, conveniently be employed to control the supply of auxiliary air to the furnace, and is opened concurrently with the opening of the fuel valve.

The time delay apparatus shown in Figs. 7 and 8 is made the subject of a divisional application Serial No. 377,461, filed August 10, 1953, and entitled Fluid Control Valve.

I claim as my invention:

1. In a fluid control valve: a casing having a passage therethrough; means movable in said casing for controlling fluid flow through said passage; flexible, normally impermeable means forming a wall of said casing exposed to said fluid; a support mounted on said casing; a sleeve mounted on the support and open at one end; an axially movable plunger slidable in said sleeve and extending through the open end; stop means at the other end of the sleeve; means connecting the plunger and the fluid flow controlling means for movement of said controlling means in accordance with the movement of said plunger; [and] an electromagnet coil surrounding the sleeve for moving the plunger and said flow controlling means [.], *said connecting means comprising a lever connected to said impermeable means with a first portion of said lever being connected to said controlling means and with a second portion of said lever being connected to said plunger, and means pivoting said lever on said casing about a pivoting axis which is in close proximity to said impermeable means such that the spacing between the impermeable means and said pivoting axis is relatively small in comparison to either the distance between said pivoting axis and said plunger or the distance between said pivoting axis and said controlling means.*

2. In a fluid control valve: a casing having a passage therethrough; flexible, normally impermeable means forming a wall of said casing exposed to said fluid; means movable in the casing and attached to the wall for controlling fluid flow through said passage; a support mounted on said casing; a sleeve mounted on the support and open at one end; an axially movable plunger slidable in said sleeve and extending through the open end; means connected to the plunger *and said flow controlling means* and joined to the outer surface of the flexible means for moving said flow-controlling means in accordance with the movement of said plunger; stop means for the plunger at the other end of said *sleeve* [means] ; [and] an electromagnet coil surrounding the sleeve for causing the plunger to move inwardly of the sleeve against the stop means and for moving said flow controlling means [.], *said aforementioned means connected to the plunger comprising a lever attached to said impermeable means and pivoted on said casing about a pivoting axis which is in close proximity to said impermeable means such that the distance between said impermeable means and said pivoting axis is substantially less than either the distance between said impermeable means and said plunger or the distance between said diaphragm and said flow controlling means.*

3. In a fluid control valve: a casing having a passage therethrough; a flexible, normally impermeable means forming a wall of said casing and exposed to said fluid, said wall forming a seal for the casing; a housing covering said wall externally of the casing; a sleeve supported on a wall of the housing and having an end opening into the housing; stop means closing the other end of the sleeve; an electromagnet coil surrounding the sleeve and externally of the housing; a plunger slidable in said sleeve and extending through the open end into the housing; said housing being fluid-tight; a movable mechanism having elements attached to opposite sides of the flexible means for controlling the flow of fluid through the passage; and means connecting the plunger to the element that is external of the valve passage for moving said mechanism in accordance with the movement of said plunger.

4. In a fluid control valve: a casing having a passage therethrough; means in said casing for controlling fluid flow through said passage; a solenoid device mounted on the casing and comprising an attractable plunger; a lever pivotally mounted intermediate its ends on the casing and connected at one of its ends to said plunger; means operatively connecting said lever with said flow-controlling means; and a manually reciprocable member biased in one direction and movable in the other direction, and positioned so as to engage the other end of the lever and rock it, only while said solenoid is unenergized, to operate the flow-controlling means to open position and simultaneously move the plunger to a partially attracted position; the other end of the lever forming a detent cooperable, when the lever is in said manually rocked position, with a notch in said reciprocable member so as to maintain the lever in said rocked position with the member in engagement therewith; movement of the plunger to its fully attracted position, upon energization of the solenoid, so rocking the lever as to permit withdrawal of said detent from said notch so that the reciprocable member is retracted under the force of said bias.

5. In a fluid control valve: a valve body having means forming a valve seat, said body having an opening; a closure member in the body; a flexible normally impermeable wall sealing said opening, and exposed on one side to the interior of the body; a housing covering said wall, said housing having an aperture; the other side of said wall being exposed to the interior of the housing; a sleeve supported on the housing, and opening only at one end into the housing; said housing opening exteriorly only at said aperture; an electromagnet coil surrounding the sleeve and externally of the housing; a plunger slidable in said sleeve and extending through the open end into the housing; mechanism having elements attached on opposite sides of the flexible wall for operating said closure member, said plunger being connected to one of the elements that is external of the valve body for operating the mechanism; movable operating means extending through said housing aperture for moving said one element independently of the electromagnet coil; resilient means urging said operating means outwardly of the housing; and stop means carried by said operating means and limiting outward movement of said operating means, said stop means sealingly engaging about said housing aperture in the limiting position of said operating means.

6. In a fluid control valve: a valve body having means forming a valve seat, said body having an opening; a closure member in the body; a flexible normally impermeable wall sealing said opening, and exposed on one side to the interior of the body; a housing covering said wall, said housing having an aperture; the other side of said wall being exposed to the interior of the housing; a sleeve supported on the housing, and opening only at one end into the housing; said housing opening exteriorly only at said aperture; an electromagnet coil surrounding the sleeve and externally of the housing; a plunger slidable in said sleeve and extending through the open end into the housing; mechanism having elements attached on opposite sides of the flexible wall for operating said closure member, said plunger being connected to one of the elements that is external of the valve body for operating the mechanism; a manually movable plunger extending through said housing aperture for moving said one element independently of the electromagnet coil; means forming a shoulder on said manually movable plunger limiting outward movement of said plunger; resilient means urging said manually movable plunger outwardly of the housing and toward inoperative position; and a sealing element carried by said manually movable plunger and engaging about said aperture to seal said housing upon movement of said manually movable plunger to inoperative position.

7. In a fluid control valve: a valve body having a passage therethrough; a lever pivoted on the body and having means for closing said passage upon angular movement of said lever to one position; resilient means biasing said lever to said one position; electromagnetic means for moving said lever away from said one position and to another position in which said passage is open; a manually reciprocable member biased in one direction and movable in the other direction; said lever having a portion in the path of movement of said reciprocable member, said portion being moved out of the path of movement of said reciprocable member when said lever is in said other position; movement of said reciprocable member in said other direction when said portion is in the path of movement thereof moving said lever to an intermediate position in which said passage is open; and means forming a detachable latch between said reciprocable member and said lever portion to prevent retraction of said lever and said reciprocable member to their respective biased positions, said latch being moved to disengaging position upon movement of said lever to said other position by said electromagnetic means.

8. In a fluid control valve: a valve body having a passage therethrough; a lever pivoted on the body and having means for closing said passage upon angular movement of said lever to one position; resilient means biasing said lever to said one position; electromagnetic means for moving said lever away from said one position and to another position in which said passage is open; a manually reciprocable plunger; means guiding said plunger for longitudinal movement; resilient means urging said plunger in one longitudinal direction and to one angular position; said plunger being movable in the other longitudinal direction as well as away from said one angular position; said lever having a portion in the path of movement of said reciprocable member when said reciprocable member is in said one angular position, said portion being moved out of the path of movement of said reciprocable member when said lever is in said other position; movement of said reciprocable member in said other direction when said portion is in the path of movement thereof moving said lever to an intermediate position in which said passage is open; and means forming a detachable latch between said reciprocable member and said lever portion to prevent retraction of said lever to said one position and to prevent longitudinal retraction of said reciprocable member in said one longitudinal direction, said latch being moved to disengaged position upon movement of said lever to said other position by said electromagnetic means, said latch also being moved to disengaged position upon angular movement of said plunger away from said one angular position.

9. In a fluid control valve: a valve body having a passage therethrough; a lever pivoted on the body and having means for closing said passage upon angular movement of said lever to one position; resilient means biasing said lever to said one position; electromagnetic means for moving said lever away from said one position and to another position in which said passage is open; a manually reciprocable element biased in one direction and movable in the other direction; said lever having an element in the path of movement of said reciprocable element, said lever element being moved out of the path of movement of said reciprocable element when said lever is in said other position; one of said elements providing a surface inclined to the direction of movement of said one element, as well as a reentrant shoulder adjoining said surface; the other element forming a projection; said projection being engageable with said surface to move said lever from said one position upon movement of said reciprocable element to said other position when said lever element is in the path of movement of said reciprocable element, and to a position intermediate said one and said other position of said lever, and in which said passage is open; said shoulder and said projection forming a latch to prevent retraction of said lever and said reciprocable element to their respective biased positions, said projection and said shoulder being moved to disengaging position upon movement of said lever to said other position by said electromagnetic means.

10. In a fluid control valve: a valve body having a passage therethrough; a lever pivoted on the body and having means for closing said passage upon angular movement of said lever to one position; resilient means biasing said lever to said one position; electromagnetic means for moving said lever away from said one position and to another position in which said passage is open; a manually reciprocable plunger; means guiding said plunger for longitudinal movement; resilient means urging said plunger in one longitudinal direction and to one angular position; said plunger being movable in the other longitudinal direction as well as away from said one angular position; said lever and said plunger having elements engageable with each other, the element of the lever being in the path of movement of said plunger element when said reciprocable plunger is in said one angular position, said lever element being moved out of the path of movement of said plunger element when said lever is in said other position; one of said elements providing a surface inclined to the direction of movement of said one element, as well as a reentrant shoulder adjoining said surface; the other element forming a projection; said projection being engageable with said surface to move said lever from said one position upon movement of said reciprocable plunger in said other direction when said lever element is in the path of movement of said plunger element, and to a position intermediate said one and said other position of said lever, and in which said passage is open; said shoulder and said projection forming a latch to prevent retraction of said lever and said reciprocable element to their respective biased positions when said plunger is in said one angular position; said projection and said shoulder being moved to disengaging position upon movement of said lever to said other position by said electromagnetic means, said projection and said shoulder also being moved to disengaging position upon angular movement of said plunger away from said one angular position.

*11. A control valve as set forth in claim 1 in which manually operable means is mounted on said casing and engageable with said lever for applying a turning force to said lever to pivot the same about said pivoting axis and move said flow controlling means to an open position with respect to said passage.*

*12. A control valve as set forth in claim 2 in which manually operable means is mounted on said casing and engageable with said lever for applying a force to said lever to pivot the same about said pivoting axis and move said flow controlling means to an open position with respect to said passage.*

*13. A control valve as set forth in claim 1 in which said plunger has its axis extending in a non-parallel direction with respect to the path of movement of said fluid controlling means, and means pivotally connecting said lever to said plunger to allow said plunger to move in said non-parallel direction when and as said fluid flow controlling means is being moved.*

*14. A control valve as set forth in claim 2 in which manually operable means is mounted on said casing and engageable with said lever for applying a force to said lever to pivot the same about said pivoting axis and move said flow controlling means to an open position with respect to said passage, said plunger having its axis extending in a non-parallel direction with respect to the path of movement of said fluid controlling means, and means pivotally connecting said lever to said plunger to allow said plunger to move in said non-parallel direction when and as said fluid flow controlling means is being moved.*

*15. In a fluid control valve: a casing having a passage therethrough; means movable in said casing for controlling fluid flow through said passage; flexible, normally impermeable means forming a wall of said casing exposed to said fluid; a support mounted on said casing; a sleeve mounted on the support and open at one end; an axially movable plunger slidable in said sleeve and extending through the open end; stop means at the other end of the sleeve; means connecting the plunger and the fluid flow controlling means for movement of said controlling means in accordance with the movement of said plunger; an electromagnet coil surrounding the sleeve for moving the plunger and said flow controlling means, said impermeable means comprising a generally planar diaphragm, said connecting means comprising a lever attached to said diaphragm with a first portion of said lever being connected to said controlling means and with a second portion of said lever being connected to said plunger, and means pivoting said lever on said casing about a pivoting axis which is in close proximity to said diaphragm such that the spacing between the diaphragm and said pivoting axis is relatively small in comparison to either the distance between said pivoting axis and said plunger or the distance between said pivoting axis and said controlling means.*

*16. In a fluid control valve: a casing having a passage therethrough; flexible, normally impermeable means forming a wall of said casing exposed to said fluid; means movable in the casing and attached to the wall for controlling fluid flow through said passage; a support mounted on said casing; a sleeve mounted on the support and open at one end; an axially movable plunger slidable in said sleeve and extending through the open end; means connected to the plunger and said flow controlling means and joined to the outer surface of the flexible means for moving said flow-controlling means in accordance with the movement of said plunger; stop means for the plunger at the other end of said sleeve; an electromagnet coil surrounding the sleeve for causing the plunger to move inwardly of the sleeve against the stop means and for moving said flow controlling means, said impermeable means comprising a generally planar diaphragm, said aforementioned means connected to the plunger comprising a lever attached to said diaphragm and pivoted on said casing about a pivoting axis which is in close proximity to said diaphragm such that the distance between said diaphragm and said pivoting axis is substantially less than either the distance between said diaphragm and said plunger or the distance between said diaphragm and said flow controlling means.*

*17. A control valve as set forth in claim 16 in which said pivoting axis extends generally parallel with the plane of the diaphragm and is located adjacent to and within the projected area of said diaphragm.*

References Cited in the file of this patent or the original patent

UNITED STATES PATENTS

| | | |
|---|---|---|
| 1,627,154 | Mark | July 26, 1927 |
| 1,992,902 | McIntosh | Feb. 26, 1935 |
| 1,996,309 | Simpson | Apr. 2, 1935 |
| 2,114,446 | Hildebrecht | Apr. 19, 1938 |
| 2,121,321 | Kronmiller | June 21, 1938 |
| 2,132,204 | Davis | Oct. 4, 1938 |
| 2,169,696 | Hotchkiss | Aug. 15, 1939 |
| 2,194,276 | Carlson | Mar. 19, 1940 |
| 2,245,834 | Sparrow | June 17, 1941 |
| 2,333,261 | Mantz | Nov. 2, 1943 |
| 2,357,013 | McKinnis | Aug. 29, 1944 |
| 2,406,246 | Ogden | Aug. 20, 1946 |